United States Patent Office 3,741,923
Patented June 26, 1973

3,741,923
ELECTROPHORETIC COATING COMPOSITION CONTAINING A HEAT-CURABLE ACRYLATE RESIN, A FINE PARTICULATE COPOLYMER AND A PLASTICIZER
Peter Fritsche and Heidemarie Hulsmann, Hiltrup, Germany, assignors to Glasurit-Werke M. Winkelmann G.m.b.H., Hamburg-Wandsbek, Germany
No Drawing. Filed July 7, 1971, Ser. No. 160,536
Claims priority, application Germany, Aug. 10, 1970, P 20 39 677.4
Int. Cl. C08f 45/26
U.S. Cl. 260—23 AR
6 Claims

ABSTRACT OF THE DISCLOSURE

An electrophoretic coating composition useful in preparing textured coatings is prepared by emulsifying a copolymer component II in alkaline ammonium and/or strong organic nitrogen bases in the presence of water to a stable dispersion. The copolymer component II is 10-25 percent by weight of the total composition and has therein (a) 60-95 percent by weight of styrene,
(b) 0.5-10 percent by weight of $\alpha,\beta$-unsaturated dicarboxylic acid having 3-5 carbon atoms, and
(c) 4.5-30 percent by weight of $\alpha,\beta$-vinyl or $\alpha,\beta$-vinylidene compound copolymerized therewith.

15-20 percent by weight of a plasticizer component III is added to the dispersion of component II at a pH of at least 8.5. The plasticizers of component III are compatible with components II and the later-mentioned component I, such as esters of phthalic acid, isophthalic acid, terephthalic acid, adipic acid, sebacic acid, glycolic acid, tartaric acid, citric acid, ricinoleic acid and mxtures thereof. To the dispersion of components II and III a solution of acrylate resin component I in organic solvents is added and the pH is adjusted to 8.2±0.3. Acrylate resin component I is 60-70 percent by weight of the composition and contains (a) 50-90 percent by weight of an ester of acrylic or methacrylic acid with an aliphatic monoalcohol having 1-8 carbon atoms,
(b) 1-15 percent by weight of an $\alpha,\beta$-unsaturated dicarboxylic acid having 3-5 carbon atoms, and
(c) 5-49 percent by weight of an $\alpha$-$\beta$-vinyl or $\alpha$-$\beta$-vinylidene compound copolymerized therewith. The dispersion of components I, II, and III is diluted with water to a solids content of about 5-20 percent.

BACKGROUND OF THE INVENTION

The present invention is particularly concerned with the production of textured coatings using the electrodeposition method wherein the coating composition is finely dispersed in an aqueous phase at least partially in the form of the salts thereof, is anodically deposited on metallic surfaces and thereafter cured.

The state of the prior art of electrophoretic deposition of coatings from aqueous suspension may be ascertained by reference to U.S. Pat. 3,230,162 of Gilchrist, dated Jan. 18, 1966, and the Kirk-Othmer "Encyclopedia of Chemical Technology," 1st Ed., vol. 5 (1950), under the section "Electrophoretic Deposition," pp. 606-610, and vol. 8, 2nd Ed. (1965), under the section "Electrophoretic Deposition," pp. 23-26. The plasticizers useful in the present invention are disclosed in Kirk-Othmer, 2nd Ed., vol. 15 (1968), under the section "Plasticizers," pp. 720-789, particularly page 762 which discloses poly(methyl methacrylate) plasticizers, page 765, surface coatings, and pages 778-781, Table 13, which discloses adipic acid derivatives, glycol derivatives, glycolates, isophthalic acid derivatives, phthalic acid derivatives, and sebacic acid derivatives. U.S. Pat. 3,563,929 of Rolf Güldenpfenning which issued Feb. 16, 1971 discloses an improvement in the process of preparing water-dilutable resin ester coating compositions from the reaction products of hydrolyzed adducts of $\alpha,\beta$-unsaturated dicarboxylic acid compounds with partial esters of epoxy compounds which are reacted with aqueous ammonia and/or strong organic nitrogen bases in the presence of water, wherein $\alpha,\beta$-vinyl and $\alpha,\beta$-vinylidene compounds are copolymerized therewith.

French Pat. 1,475,382 of Hans Wilhelm et al discloses the preparation of the acrylate component I of the present invention. The copolymer component II can be prepared as it was in German Pat. 743,945 of Hans Fikentscher and Rudolf Gäth, which was filed June 3, 1940.

Processes for the electrophoretic production of coatings on metallic workpieces by dipping the article, connected as the anode, into an electrodeposition bath are conventional. Thus, Swiss Pat. 419,770 of Gottfried Tröger et al., filed Apr. 24, 1963, describes the use of baking enamels containing, as the binders, acrylate resins, alkyd resins, or maleate oils by themselves or in combination with urea resins and melamine resins. The coatings thus obtained are baked for at least one-half hour at 120 or 130° C.

In U.S. Pat. 3,230,162 of Gilchrist, which issued Jan. 18, 1966, an anodic electrocoating process is disclosed wherein baked enamel coatings are produced with the use of neutralized polycarboxylic acid resins.

In British Pats. 1,161,819 and 1,168,269 of Glasurit, the electrophoretic deposition of acrylate polymers from their neutralized aqueous solutions is disclosed and these deposits are processed into baked enamel coatings.

In accordance with conventional electrodeposition processes, coatings of high hardness and a smooth surface are obtained having a more or less high gloss. In general, metal sheets are required for such coatings which are free of flaws, without indentations and grooves, because such non-uniformity would be noticeable through the varnish coat. In order to be able to use those metal sheets having poorer quality and surface characteristics, it is desirable to use special effect imparting coating compositions in the electrodeposition process, which result in textured coatings and possess the same satisfactory corrosion properties as the conventional coating compositions capable of being used for electrodeposition.

SUMMARY OF THE INVENTION

The problem of producing textured coatings by an electrocoating procedure was surprisingly solved by using coating compositions finely dispersed in an aqueous phase at least partially in the form of the alkali, ammonium and/or amine salts thereof, which are anodically deposited, optionally together with further customary additives, on metallic surfaces and subsequently baked. These coating compositions are characterized in that they contain the following components:

(I) 60-70 percent by weight of a heat-curable acrylate resin suitable as a binder for electrocoating, containing:
 (a) 50-90 percent by weight of at least one ester of acrylic acid and/or methacrylic acid with straight-chain or branched aliphatic monoalcohols having 1-8 carbon atoms,
 (b) 1-15 percent by weight of a copolymerizable olefinically unsaturated carboxylic acid having 3-5 carbon atoms, and
 (c) 5-49 percent by weight of at least one additional copolymerizable, monomeric, olefinically unsaturated compound, polymerized into the acrylate resin;

(II) 10-25 percent by weight of a fine-particulate copolymer having a softening temperature of more than 100°

C. and an average particle diameter of 0.01–2 microns, containing polymerized therein:

(a) 60–95 percent by weight of styrene, (b) 0.5–10 percent by weight of a copolymerizable ofinically unsaturated carboxylic acid having 3–5 carbon atoms, and (c) 4.5–30 percent by weight of at least one further copolymerizable olefinically unsaturated compound; and (III) 15–20 percent by weight of a customary plasticizer compatible with components I and II, exhibiting a boiling point of above 150° C. such as adipic acid derivatives, glycol derivatives, glycolates, isophthalic acid derivatives, phthalic acid derivatves and sebacic acid derivatives.

DESCRIPTION OF THE PREFERRED EMBODIMENTS

The coatings obtained by means of the coating compositions of the present invention are baked enamel coatings and exhibit a textured surface. The texture can have a variety of appearances and exhibits an extremely uniform pleasant effect which can sometimes simulate a stippled character or a leather-like grained coat. The effect is variable and depends on the voltage applied. At a higher voltage, the effect becomes coarser and larger in texture, whereas it becomes finer at a low voltage. The coatings are furthermore distinguished by high corrosion resistance and high elasticity. The coating composition exhibits excellent bath stability and good throwing power. In the short-term weathering test in accordance with DIN (German Industrial Standard) 50018, the coatings did not yet show any signs of attack after 6 rounds in an $SO_2$-steam atmosphere. Also in a test at a constant steam atmosphere of 40° C. and 95 percent relative atmospheric humidity, the metallic plates coated with the coating compositions of the present invention withstood attack for at least 1000 hours. In he salt-spray test according to ASTM B 117-64, plates coated according to the invention were still flawless after 168 hours.

The heat-curable acrylate resin (Component I) contains as part (a) 50–90, preferably 70–80 percent by weight of a tleast one ester of acrylic acid and/or methacrylic acid with straight-chain or branched aliphatic monoalcohols having 1–8 carbon atoms, polymerized into this resin I. Suitable esters of acrylic acid or methacrylic acid are those with straight-chain or branched alcohols, such as, for example, methanol, ethanol, propanol, n-butanol, isobutanol, tert.-butanol, amyl alcohol, hexyl alcohol, heptanol, octanol, 2-ethylhexanol, as will as mixtures of these esters. Particularly suitable are the esters of acrylic acid with n-butanol or isobutanol, as well as ethyl methacrylate, or mixtures of these esters.

As part (b), component I contains 1–15 percent by weight of at least one copolymerizable olefinically unsaturated carboxylic acid having 3–5 carbon atoms. In addition to itaconic acid, citraconic acid, mesaconic acid, and maleic acid, the monoesters thereof with alcohols having 1 to 8 carbon atoms, or maleic anhydride, preferred are acrylic acid and methacrylic acid.

As part (c), 5–49 percent by weight of at least one further copolymerizable, monomeric, olefinically unsaturated compound is contained polymerized in component I. Such compounds can be the usual copolymerizable vinyl compounds, such as vinyl esters, e.g. vinyl pivalate, vinyl "Versatic" esters, and vinyl aromatics, such as for example, styrene, vinyltoluene, p-chlorostyrene, as well as acrylonitrile, methacrylonitrile, and acrylamide, methacrylamide, methylol methacrylamide, methylol acrylamide and/or ethers of methylol acrylamide and methylol methacrylamide with an alcohol containing 1–8 carbon atoms, such as, e.g. N-butoxymethylmethacrylic acid amide, as well as esters and monoesters of acrylic acid and/or methacrylic acid with a polyhydric alcohol having 2 to 5 carbon atoms, e.g. ethylene glycol, propylene glycol, or butylene glycol.

The acid number of component I ranges generally between 30 and 100, preferably between 50 and 80. Component I normally has a K-value, measured according to the method by H. Fikentscher (see "Zelluloschemie," vol. 13, page 58 of 1932) of 15–35, preferably 18–25. The production of component I is effected according to known processes. Thus, the acrylate resin component I can be obtained, for example, according to French Patent 1,475,382 of Hans Wilhelm et al. After the polymerization, the largest part of the solvent is distilled off. The concentrated, still warm solution of acrylate resin component I is mixed with such an amount of ammonia or an organic base that, upon subsequent dilution with water, a stable solution or dispersion is produced. For this end, it is necessary to neutralize at least ⅓ of the carboxyl groups present in acrylic resin component I by means of ammonia or strong organic nitrogen bases.

Suitable as strong organic nitrogen bases are, in particular, water-miscible organic amines, such as, for example, trialkylamines which can optionally be further substituted, as such, for example, dimethylethanolamine. Suitable amines are disclosed in U.S. Patent 3,563,929.

Parts (b) and (c) of copolymer component II are those already set forth under (b) and (c) for the heat-curable acrylate resin component I and specific examples are disclosed in U.S. Patent 3,563,929.

The copolymer component II can be prepared, for instance, in accordance with German Patent 743,945 of Hans Fikentscher and Rudolf Gäth, filed June 13, 1940. This polymer is normally obtained in the form of a fine powder having a softening temperature of above 100° C. and an average particle diameter of 0.01–2 microns.

As component III, 15–20 percent by weight of one of the ordinary plasticizers compatible with components I and II are contained in the coating composition, this plasticizer having a boiling point of more than 150° C. Such plasticizers are, in particular, esters of phthalic acid, isophthalic acid, or terephthalic acid with a monohydric aliphatic alcohol having 4–10 carbon atoms, such as, for example, n-butanol, isobutanol, tert.-butanol, amyl alcohol, hexyl alcohol, heptanol, octanol, isooctanol, 2-ethylhexanol, nonanol, decanol, isodecyl alcohol. Furthermore, suitable are esters of adipic acid and sebacic acid, as well as those of hydroxycarboxylic acids, such as glycolic acid, tartaric acid, citric acid, ricinoleic acid with the above-mentioned alcohols, and furthermore glycolic acid ester plasticizers, such as ethyl phthalyl ethyl glycolate, butyl phthalyl butyl glycolate, methyl phthalyl ethyl glycolate. Furthermore, suitable are acetyl triethyl citrate, acetyl tributyl citrate, castor oil, as well as esters of higher fatty acids, such as lauric acid, stearic acid, oleic acid with one of the above-mentioned monohydric aliphatic alcohols having 4–10 carbon atoms. Also suitable as plasticizers are higher mono- and polyhydric alcohols, such as octanol, nonanol, decanol, isooctyl alcohol, isodecyl alcohol, ethylene glycol, propylene glycol, butylene glycol, ethylene glycol monoethyl ether, diethylene glycol monoethyl ether, ethylene glycol monopropyl ether, ethylene glycol monobutyl ether, diethylene glycol monobutyl ether and glycerin. The alcohols can be employed by themselves or in a mixture with other plasticizers.

In order to prepare the coating compositions of this invention, the copolymer II, ordinarily present in the form of a fine powder, is emulsified in alkaline aqueous ammonia or in amine-containing water into a stable dispersion. Component III is then added thereto, and the emulsion agitated until a gel-free dispersion is obtained. The pH is to be at least 8.5. The proportion of ammonia is generally not more than 2 percent, based on a 25 percent ammonia solution. To the dispersion thus prepared of component II and component III, a solution of the acrylate resin I in organic solvents, made alkaline to a pH of 8.2±0.3, is admixed by means of a homogenizer. The dispersion produced is diluted, with fully desalted water, to a solids content of generally 5–20, preferably 10–15 percent by weight. Prior to the dilution of the dispersion, it is possible to admix thereto also an aqueous paste of carbon black and/or other pigment pastes. The pigments can also be incorporated into the solid phase by the use of methods customary in varnish technology. In addition to the various types of carbon black, suitable pigments are all ordinary ones, for example, titanium dioxide, iron oxide pigments, phthalocyanine pigments, silicates, quartz and talc.

Examples of the organic solvents for component I include alcohols having 1 to 10 carbon atoms, e.g. methanol, ethanol, propanol, isopropanol, normal butanol, isobutanol, normal amyl alcohol, tertiary amyl alcohol, hexyl alcohol, octanol, nonanol, decanol, isooctyl alcohol, isodecyl alcohol and ether of polyhydric alcohols, e.g. ethylene glycol, diethylene glycol monoethyl ether, ethylene glycol monopropyl ether, ethylene glycol monobutyl ether, diethylene glycol monobutyl ether.

Optionally, further conventional additives can be added to the emulsion, such as phenolic resins, maleated alkyd resins, maleated oils, acrylate or methacrylate polymers, defrothers, flow agents, stabilizers, antioxidants, and organic solvents.

The coating composition preferably exhibits a conductive value of $1300 \pm 300$ $\mu$S. cm.$^{-1}$ (micro Siemens/cm.). For purposes of electrocoating, the article to be coated is connected as the anode and dipped into the coating composition. The deposition is generally conducted in steel vessels connected as the cathode. The bath temperature is between 20 and 50° C.

The articles to be coated can be made of metals, preferably pretreated or unpretreated iron or steel sheets, aluminum sheets, or other electrically conductive articles such as metal coated plastics.

The deposition is generally conducted at a D.C. voltage of between 150 and 500 volts. After about two minutes, a uniform coat has been formed on the article to be coated, with a textured surface and a film thickness of between 25 and 50 microns, and this coat is baked after rinsing with water.

The advantage of this process resides in that the texture can be controlled in a great variety of ways by varying the voltage. Secondary influences, as they are known from the conventional texture varnishing method can be entirely eliminated in the electrocoating process.

The parts and percentages set forth in the examples are parts by weight and percent by weight.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Example 1

(A) Production of a curable acrylate resin, component I.—The following compounds are gradually introduced into isobutanol, maintained at 90° C.:

35 parts of tert.-butyl acrylate
35 parts n-butyl acrylate
16 parts N-methylol acrylamide, etherified with isobutanol
8 parts acrylic acid
5 parts butanediol monoacrylate
0.6 part of azobisisobutyronitrile
2 parts of tert.-dodecyl mercaptan As soon as the reaction is initiated (as indicated by evolution of heat), the mixture is cooled in such a manner that the temperature thereof remains at 90° C. After 2 hours, respectively, 0.3 part of azobisisobutyronitrile is added at intervals of one hour, respectively, until the reaction is completed. The temperature is maintained at 90° C. until the end of the polymerization. After the polymerization is terminated, such an amount of solvent is distilled off, optionally under a weak vacuum, that the solids content is 70 percent.

(B) Preparation of copolymer Component II:

770 parts of styrene,
120 parts of acrylonitrile, and
5 parts of methacrylonitrile are emulsified in 1000 parts of water, containing dissolved therein:

30 parts of sodium octodecanesulfonate,
10 parts potassium persulfate, and
60 parts monomeric acrylic acid.

Then, the reaction emulsion is polymerized at 80–85° C., thus obtaining a polymer dispersion which is freed of water in a "Krause" dryer at about 60–65° C. The polymer is obtained as a fine white powder.

(C) Preparation of the coating composition.—100 parts of powder B are converted, with 105 parts of 1.25 percent strength ammonia solution into a stable dispersion with the aid of an agitator. To this dispersion are added another 35 parts of dibutyl phthalate, and the mixture is stirred to form a homogeneous dispersion having a pH of 9.2.

This dispersion is mixed with 381 parts of a neutralized solution of the 70 percent acrylate resin solution A.

This neutralized solution was obtained from 370 parts of the 70 percent acrylate resin solution A, and 11 parts of dimethylethanolamine, and has a pH of 8.2.

The mixture are prepared into a uniform dispersion with the aid of a homogenizer. Thereafter, for pigmenting purposes, the following are additionally admixed thereto:

45 parts of isodecanol, and
150 parts of carbon black dispersion with 15 parts of solid carbon black content.

Finally, the mixture is diluted with deionized water to a solids content of 14 percent. The pH is 8.3.

For purposes of electrocoating, respectively one deep-drawn metal sheet having a size of 10 x 10 cm.$^2$ is employed and connected as the anode. In case of one sheet, a deposition procedure is conducted at a deposition voltage of 250 volts. With the other sheet, a deposition is carried out at a deposition voltage of 350 volts. The deposition period is two minutes in both instances. After rinsing with water, coatings are obtained which are baked for 20 minutes at 170° C.

The coating deposited at 250 volts exhibits a uniform effective texture having a fine, uniformly distributed stippled appearance. The coating deposited at 350 volts has a coarser structure. In the flexural strength test with the use of a mandrel, the coatings can be bent over a mandrel of 8 mm. without damage. They furthermore achieve an Erichsen depression of at least 5 mm. In the short-term weathering test according to DIN 50018, the film was still flawless after 6 rounds. In the salt-spray testing device according to ASTM B 117–64, no corrosion phenomena were noticed even after 168 hours.

Example 2

Example 1 was repeated, except that, as a modification, dibutyl phathalate was employed in place of the isodecanol utilized in 1 (C). Here again, the baked coatings exhibited a uniform textured effect.

Example 3

Example 1 was repeated, with the difference that a phthalocyanine-blue paste was used in place of the carbon black paste. The baked coatings exhibited a uniform, leather-like grain effect.

We claim:
1. Improved film-forming organic resin paint aqueous binder replenishment concentrated compositions for the production of textured coatings adapted for dispersing in an aqueous electrocoating bath containing sufficient ad- ditional water-soluble amino compound to impart anionic polyelectrolyte behavior in said bath to resin in said binder concentrate compositions, said binder concentrate compositions comprising;
(I) about 60–70 percent by weight of a heat-curable acrylate resin comprising polymerized therein:
  (a) about 50–90 percent by weight of an ester of methacrylic acid or acrylic acid with an alcohol having 1–8 carbon atoms;
  (b) about 1–15 percent by weight of an α,β-olefinically unsaturated carboxylic acid having 3–5 carbon atoms; and
  (c) about 5–49 percent by weight of at least one further copolymerizable, monomeric, olefinically unsaturated compound;
(II) about 10–25 percent by weight of a fine-particulate copolymer having a softening temperature of more than 100° C. and an average particle diameter of 0.01–2 microns, containing polymerized therein:
  (a) about 60–95 percent by weight of styrene;
  (b) about 0.5–10 percent by weight of an α,β-olefinically unsaturated carboxylic acid having 3–5 carbon atoms; and
  (c) about 4.5–30 percent by weight of at least one further copolymerizable olefinically unsaturated compound; and
(III) about 15–20 percent by weight of a plasticizer compatible with components I and II, said plasticizer having a boiling point of above 150° C. and being selected from the group consisting of esters of phthalic acid with monohydric aliphatic alcohols having 4–10 carbon atoms, esters of isophthalic acid with monohydric aliphatic alcohols having 4–10 carbon atoms, esters of terephthalic acid with monohydric aliphatic alcohols having 4–10 carbon atoms, esters of adipic acid with monohydric aliphatic alcohols having 4–10 carbon atoms, esters of sebacic acid with monohydric aliphatic alcohols having 4–10 carbon atoms, esters of glycolic acid with monohydric aliphatic alcohols having 4–10 carbon atoms, esters of tartaric acid with monohydric aliphatic alcohols having 4–10 carbon atoms, esters of citric acid with monohydric aliphatic alcohols having 4–10 carbon atoms, esters of ricinoleic acid with monohydric aliphatic alcohols having 4–10 carbon atoms, esters of lauric acid with monohydric aliphatic alcohols having 4–10 carbon atoms, esters of stearic acid with monohydric aliphatic alcohols having 4–10 carbon atoms, esters of oleic acid with monohydric aliphatic alcohols having 4–10 carbon atoms, ethyl phthalyl ethyl glycolate, butyl phthalyl butyl glycolate, methyl phthalyl ethyl glycolate, acetyl triethyl citrate, acetyl tributyl citrate, castor oil, octanol, nonanol, decanol, isooctyl alcohol, isodecyl alcohol, ethylene glycol, propylene glycol, butylene glycol, ethylene glycol monoethyl ether, diethylene glycol monoethyl ether, ethylene glycol monopropyl ether, ethylene glycol monobutyl ether, diethylene glycol monobutyl ether, glycerine and mixtures thereof.

2. The composition of claim 1 wherein said plasticizer component III has a boiling point range of about 150 to 400° C.

3. The compositions of claim 1 wherein said components I(c) and II(c) are selected from the group consisting of vinyl pivalate, styrene, vinyltoluene, p-chlorostyrene, acrylonitrile, methacrylonitrile, acrylamide, methacrylamide, methylol methacrylamide, methylol acrylamide, ethers of methylol acrylamide with an an alcohol having 1–8 carbon atoms, ethers of methylol methacrylamide with an alcohol having 1–8 carbon atoms, esters of acrylic acid with polyhydric alcohols having 2 to 5 carbon atoms, esters of methacrylic acid with polyhydric alcohols having 2 to 5 carbon atoms and mixtures thereof.

4. The composition of claim 1, wherein said component I(a) is selected from the group consisting of ester of acrylic acid with methanol, ester of acrylic acid with ethanol, ester of acrylic acid with propanol, ester of acrylic acid with n-butanol, ester of acrylic acid with isobutanol, ester of acrylic acid with tert.-butanol, ester of acrylic acid with amyl alcohol, ester of acrylic acid with hexyl alcohol, ester of acrylic acid with heptanol, ester of acrylic acid with octanol, ester of acrylic acid with 2-ethylhexanol, ester of methacrylic acid with methanol, ester of methacrylic acid with ethanol, ester of methacrylic acid with propanol, ester of methacrylic acid with n-butanol, ester of methacrylic acid with isobutanol, ester of methacrylic acid with tert.-butanol, ester of methacrylic acid with amyl alcohol, ester of methacrylic acid with hexyl alcohol, ester of methacrylic acid with heptanol, ester of methacrylic acid with octanol, ester of methacrylic acid with 2-ethylheptanol, and mixtures thereof.

5. The compositions of claim 1, wherein said components I(c) are α,β-vinyl or α,β-vinylidene compounds.

6. The compositions of claim 1, wherein said component I has an acid number ranging between about 30 and 100 and a K value of about 15 to 35.

References Cited
UNITED STATES PATENTS

| 3,068,183 | 12/1962 | Strolle | 260—23 X |
| 3,365,410 | 1/1968 | Wesslan et al. | 260—901 X |
| 2,889,236 | 6/1959 | Hahn | 260—23 X |

FOREIGN PATENTS

| 743,945 | 1/1944 | Germany. |
| 1,475,382 | 2/1967 | France. |

DONALD E. CZAJA, Primary Examiner

E. C. RZUCIDLO, Assistant Examiner

U.S. Cl. X.R.

204—181; 260—29.6 ME, 31.2 R, 31.8 M, 33.2 R, 33.4 R, 898, 899, 901